(12) United States Patent
Dvir et al.

(10) Patent No.: US 9,652,317 B2
(45) Date of Patent: May 16, 2017

(54) REMEDYING IDENTIFIED FRUSTRATION EVENTS IN A COMPUTER SYSTEM

(71) Applicant: Soluto Ltd., Tel-Aviv (IL)

(72) Inventors: Tomer Dvir, Netanya (IL); Ishay Green, Tel-Aviv (IL); Gal Green, Tel-Aviv (IL); Kfir Ratson, Herzeliya (IL); Liad Livnat, Tel-Aviv (IL); Slav Ben-Ari, Tel-Aviv (IL)

(73) Assignee: SOLUTO LTD, Tel Aviv (IL)

( * ) Notice: Subject to any disclaimer, the term of this patent is extended or adjusted under 35 U.S.C. 154(b) by 204 days.

(21) Appl. No.: 14/323,757

(22) Filed: Jul. 3, 2014

(65) Prior Publication Data

US 2014/0325269 A1 Oct. 30, 2014

Related U.S. Application Data

(63) Continuation of application No. 12/751,600, filed on Mar. 31, 2010, now Pat. No. 8,812,909.

(60) Provisional application No. 61/213,453, filed on Jun. 10, 2009, provisional application No. 61/202,750, filed on Apr. 1, 2009.

(51) Int. Cl.
*G06F 11/07* (2006.01)
*G06F 11/34* (2006.01)

(52) U.S. Cl.
CPC ........ *G06F 11/0793* (2013.01); *G06F 11/079* (2013.01); *G06F 11/0715* (2013.01); *G06F 11/3438* (2013.01)

(58) Field of Classification Search
None
See application file for complete search history.

(56) References Cited

U.S. PATENT DOCUMENTS 7,266,726 B1 9/2007 Ladd et al.
7,640,547 B2 12/2009 Neiman et al.
(Continued)

OTHER PUBLICATIONS

Klein et al., This computer responds to user frustration: Theory, design, and results, Interacting with Computers, vol. 14, Issue 2, Feb. 2002, pp. 119-140, retrieved on Apr. 2, 2016, retrieved from the Internet <URL:http://www.labiutil.inf.ufsc.br/hiperdocumento/User%20frustation.pdf>.*

(Continued)

*Primary Examiner* — Tyler Torgrimson
(74) *Attorney, Agent, or Firm* — Fish & Richardson P.C.

(57) ABSTRACT

A data processing system comprising: a constantly updating database of a plurality of processes having a plurality of operation times, relating to a plurality of applications, relating to at least one user activity, and using a plurality of computing resources; a monitor arranged to identify a plurality of clashes between the processes, a plurality of frustration events and to correlate between the frustration events and the clashes between the processes; a cause identifier arranged to identify, for each frustration event, a cause for the correlated clash of processes; a remedy generator arranged to generate, for each cause, a remedy arranged to solve the frustration event; a communication module arranged to provide the remedies to users in relation to respective user activities in view of their frustration events; and an analyzer arranged to monitor an efficacy of the remedies in respect to their corresponding frustration events.

20 Claims, 2 Drawing Sheets

(56) References Cited

U.S. PATENT DOCUMENTS

| | | | |
|---|---|---|---|
| 8,156,502 B1 | 4/2012 | Blanding | |
| 8,812,909 B2 | 8/2014 | Dvir et al. | |
| 9,135,104 B2 | 9/2015 | Dvir et al. | |
| 2002/0165892 A1 | 11/2002 | Grumann et al. | |
| 2003/0139905 A1 | 7/2003 | Helsper et al. | |
| 2004/0103193 A1 | 5/2004 | Pandya et al. | |
| 2004/0107193 A1 | 6/2004 | Tremblay | |
| 2004/0176991 A1* | 9/2004 | McKennan | G06F 3/011 702/182 |
| 2004/0226015 A1 | 11/2004 | Leonard et al. | |
| 2005/0132014 A1 | 6/2005 | Horvitz et al. | |
| 2005/0222819 A1 | 10/2005 | Boss et al. | |
| 2007/0179791 A1 | 8/2007 | Ramesh et al. | |
| 2007/0240161 A1 | 10/2007 | Prabhakar et al. | |
| 2008/0092122 A1 | 4/2008 | Caprihan et al. | |
| 2008/0155074 A1 | 6/2008 | Bacinschi | |
| 2008/0172419 A1* | 7/2008 | Richards | G06F 17/30008 |
| 2008/0222647 A1 | 9/2008 | Taylor et al. | |
| 2008/0294423 A1 | 11/2008 | Castellani et al. | |
| 2009/0055340 A1 | 2/2009 | Lakshminarayanan et al. | |
| 2009/0157513 A1 | 6/2009 | Bonev et al. | |
| 2009/0183168 A1 | 7/2009 | Uchida | |
| 2009/0249497 A1 | 10/2009 | Fitzgerald et al. | |
| 2010/0082516 A1* | 4/2010 | Basu | G05B 13/048 706/47 |
| 2010/0121954 A1 | 5/2010 | Yang et al. | |
| 2010/0131959 A1 | 5/2010 | Spiers et al. | |
| 2010/0169893 A1 | 7/2010 | Collins et al. | |
| 2010/0257185 A1 | 10/2010 | Dvir et al. | |
| 2010/0257527 A1 | 10/2010 | Dvir et al. | |
| 2010/0257533 A1 | 10/2010 | Dvir et al. | |
| 2010/0257543 A1 | 10/2010 | Dvir et al. | |

OTHER PUBLICATIONS

Lazar et al., "Severity and Impact of Computer User Frustration: A Comparison of Student and Workplace Users," Dec. 23, 2004, retreived on Apr. 4, 2014, retrieved from the Internet <URL: http://www.cs.umd.edu/~ben/papers/Lazar2006Severity.pdf>.

Ceaparu et al., "Determining Causes and Severity of End-User Frustration," May 12, 2002, retrieved on Apr. 4, 2014, retrieved from the Internet <URL: http://www.cs.umd.edu/~ben/papers/Ceaparu2004Determining.pdf>.

Scheirer et al., "Frustrating the user on purpose: a step toward building an affective computer," retrieved on Apr. 4, 2014, retrieved from the internet <URL: http://edu.cs.uni-magdeburg.de/EC/lehre/wintersemester-2011-2012/seminar/material-1/Frustrating%20the%20user%20on%20purpose-%20a%20step%20toward%20building%20an%20affective%20computer.pdf>.

* cited by examiner

REMEDYING IDENTIFIED FRUSTRATION EVENTS IN A COMPUTER SYSTEM

CROSS REFERENCE TO RELATED APPLICATIONS

This application is a continuation of U.S. patent application Ser. No. 12/751,600, filed on Mar. 31, 2010, entitled "REMEDYING IDENTIFIED FRUSTRATION EVENTS IN A COMPUTER SYSTEM," which claims the benefit of U.S. Provisional Patent Application 61/202,750, filed on Apr. 1, 2009, entitled "USER RESOURCES AWARE SCHEDULER FOR COMPUTER OPERATING SYSTEMS AND APPLICATIONS," and U.S. Provisional Patent Application 61/213,453 filed on Jun. 10, 2009, entitled "METHOD FOR DETECTING & REDUCING PERSONAL COMPUTER USER FRUSTRATION CAUSED BY THE COMPUTER," all of which are incorporated herein by reference in their entireties.

BACKGROUND

1. Technical Field

The present invention relates to the field of computing, and more particularly, to enhancing operating system's efficacy.

2. Discussion of Related Art

Currently, the typical experience of using a personal computer (PC) is of frustration. Frustration may be caused by PC irresponsiveness to a command by the User (e.g.—delayed performance of tasks requested by the User, etc.) or by processing data unrequested by the User (e.g.—invisible resource-intensive background processes, appearance of unrequested programs as pop-ups, etc.). Presently these types of frequently recurring events are not addressed, nor even acknowledged by the PC. While systems for recording isolated, extreme software crash incidents are available, there is no method for monitoring, detection and fixing the standard, commonplace PC upsets that cause ongoing PC usage frustration.

The frustrating performance occurs regardless of the operating system ("OS") running on the PC (e.g.—Windows, MacOS, Linux, etc.). The current OS all share the basic trait of arbitrarily determining the sequence of actions to which the PC will direct its processing resources. This characteristic also enables SW manufacturers to design their products to independently claim PC resources without the active involvement of the user. This mode of operation often repeatedly gives the typical user a sense of lack of control over his PC, causing frustration with PC usage.

BRIEF SUMMARY

Embodiments of the present invention provide a data processing system comprising: a constantly updating database of a plurality of processes having a plurality of operation times, relating to a plurality of applications, relating to at least one user activity, and using a plurality of computing resources; a monitor arranged to identify a plurality of clashes between the processes, a plurality of frustration events and to correlate between the frustration events and the clashes between the processes; a cause identifier arranged to identify, for each frustration event, a cause for the correlated clash of processes; a remedy generator arranged to generate, for each cause, a remedy arranged to solve the frustration event; a communication module arranged to provide the remedies to users in relation to respective user activities in view of their frustration events; and an analyzer arranged to monitor an efficacy of the remedies in respect to their corresponding frustration events.

Embodiments of the present invention provide a computer implemented method comprising: obtaining a plurality of frustration events correlated with a plurality of clashes between processes, the processes having a plurality of operation times, relating to a plurality of applications, relating to at least one user activity, and using a plurality of computing resources; identifying, for each obtained frustration event, a cause for the correlated clash of processes; generating, for each cause, a remedy arranged to solve the frustration event; providing the remedies to users in relation to respective user activities in view of their frustration events; and monitoring an efficacy of the remedies in respect to their corresponding frustration events, wherein at least one of: the obtaining; the identifying; the generating; the providing; and the monitoring, is performed by at least one computer.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
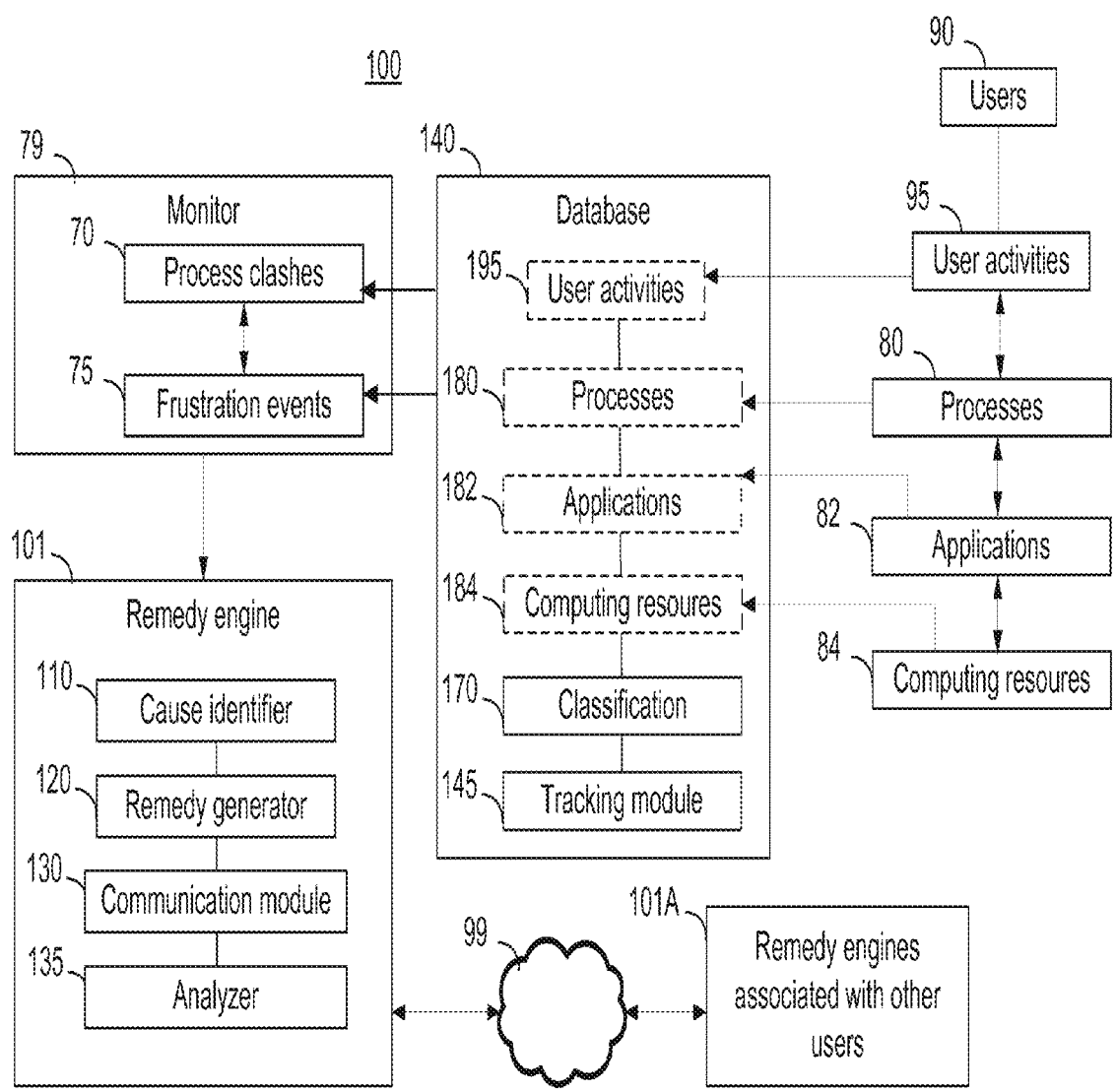
FIG. 1 is a high level schematic block diagram of a data processing system, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention relates to processes 80 relating to user activities 95 of users 90, and to the processing of applications 82 on computing resources 84, e.g., within an operating system (OS).

FIG. 1 is a high level schematic block diagram of a data processing system 100, according to some embodiments of the invention. Data processing system 100 comprises a constantly updating database 140 of a plurality of processes 180 (corresponding to processes 80) relating to a plurality of applications 182 (corresponding to applications 82) and using a plurality of computing resources 184 (corresponding to computing resources 84), at least some of processes 182 relating to at least one user activity 195 (corresponding to user activities 95).

Database 140 may embody an inventory ("Catalog") (based on a local/remote database or another repository) compiling information of every object run or processed by the PC ("Catalog Item"), for example software applications, hardware devices, online services, multimedia codecs, web applications, drivers, plug-ins, and more, creating a common basis for data analysis within the PC over time and between different PCs. The Catalog enables the system to attribute specific partial processes to an object, and analyze process behavior in the context of the full catalog item. Examples of the type of information collected for each catalog item may include: a list of related binary executable files, its typical method of usage, operational costs when the catalog item resides on the PC, descriptive text and image resources, aggregated world-wide usage level, etc.

Database 140 may comprise a tracking module 145 arranged to monitor and analyze the relevant real-time and none real-time data regarding process' requirements, processing resources availability and user's priorities, and constantly shape the processing schedule. Tracking module 145 may further track the computer and user activity providing real-time and none real-time data regarding process' requirements, processing resources availability and user's priorities.

Tracking module 145 may comprise a client primarily maps the PC inventory and creates the local database. The client continuously monitors and records inventory items' usage and changes, serving for background performance benchmarking, and creating the typical user usage preferences profiles. It may be synchronized with the system database. The client is continually tracking and analyzing usage data regarding each active catalog item. Such data may be PC resource (e.g. CPU, RAM. Storage I/O, Network, etc.) usage; typical user interaction with that particular item; correlating usage of items; and more. These data serve to deduce user' real-time preferences and the PC processing resources applied to these preferences.

Data processing system 100 further comprises a monitor 79 arranged to identify a plurality of clashes 70 between processes 80, a plurality of frustration events 75 (relating users 90 and user activities 95) and to correlate between frustration events 75 and clashes 70 between processes 80.

Clashes 70 between processes 80 may be identified by monitoring relationships among processes 80 in respect to their operation times and computing resources 84 used by each process 80, such as to identify clashes 70 between processes 80 in respect to the operation times and in respect to computing resources 84.

Frustration events 75 relating to user activities 95, expectations of user 90 in relation to user activities 95, being defined e.g. by specified criteria such as waiting time, user activity 95's prosecution time, application 82's response times etc.—may be identified by a heuristic mechanism having means of analyzing in real time the discrepancy between the user's requirement of a catalog item's processing and the actual PC resources allotted to this procedure, and recording such events ("Frustration Detector"). Preferably, the Frustration Detector is capable of tracking ongoing PC activity and ongoing user activity (using designated probes, such as a file system driver, user interaction, network activity, etc.) and providing the relevant data for the analysis process. When a significant discrepancy between the user' real-time preferences and the PC processing resources applied to these preferences occurs, a frustration event is detected by Frustration events identifier 120.

Frustration event data may comprise (e.g.—the frustration type (low responsiveness, long loading & processing time, stolen focus, crash, device error, high resources use); as well as processes suspected to be at the cause of the event; resources used at a high level that annoyed the user and triggered the event; processes are being used, and expected to serve the user; Frustration level—How annoying and/or intrusive is the frustration; etc.), and any additional data that may assist in understanding the frustration and its root causes. Optionally, a unique ID is generated, based on the nature of the frustration cause, effect and additional information categorizing the specific frustration. These data may be logged in a local storage.

Monitor 79 may provides ongoing monitoring and detection of all frustration causing clashes between processes in the background. Monitor 79 learns the typical usage habits of the user and thereby identifies processes which are not relevant to the user's current need and expected PC performance, but are concurrently running on the PC. Monitor 79 may analyze and aggregate single, unique Frustration Events into general phenomena ranked according to frequency and severity of frustration.

Data processing system 100 further comprises a remedy engine 101 comprising a cause identifier 110 arranged to identify, for each frustration event 75, a cause for the correlated clash 70 of processes 80; a remedy generator 120 arranged to generate, for each cause, a remedy arranged to solve frustration event 75; a communication module 130 arranged to provide the remedies to users 90 in relation to respective user activities 95 in view of their frustration events 75; and an analyzer 135 arranged to monitor an efficacy of the remedies in respect to their corresponding frustration events 75.

Remedy engine 101 may be connected via a communication link 99 to other remedy engines 101A of other users 90. Remedy engines 101 and 101A may share remedies and information relating to frustration events 75 and their remedies such as to improve the remedies.

Remedy engine 101 may analyze and aggregate single, unique Frustration Events 75 into general phenomena ranked according to frequency and severity of frustration. This may then be queried by the system users' community as an indicator where Remedies are most required.

Remedy engine 101 may be engine for creating, editing, synchronizing and applying software patches that may be targeted at eliminating the causes of one or more specific frustrations ("Remedy Engine"). A "Remedy" may comprise a small set of scripts, able to manage, run, stop, configure and remove different components of a system, including system configuration, 3rd party applications, startup programs, etc. A remedy may also include the required information and action in order to undo its action. A set of rules ("Conditions") may determine the relevance of application of the Remedy according to a specific user's requirements. The Remedies' Conditions and actions have full access to all real-time, short-term and long-term information collected and managed by the system (for example—is the system idle, is a user using a specific application/device frequently, how much free space the user has, etc). The Remedy Engine may be an application accessible to all system users, and may enable generation, review and approval of a Remedy by the user community. Based on a client's local identification of specific frustrations by the Frustration Detector, the Remedy Engine may offer the user to install one or more Remedies.

The global repository (which may consist of a centralized server & database, peer-to-peer storage or any other solution) may receive and accumulate data from a local database, aggregating the individual usage and infrastructural catalog item data and Frustration Event data to a "PC Genome". The PC Genome may allow data analysis to be performed for various uses within or outside of the system.

A user may use the Remedy Engine to create scripts intended to eliminate the causes of a specific Frustration. Once created and preferably approved within the system community, the specific Remedy is distributed by the system only to relevant clients, based on pre-defined conditions. Remedies are distributed gradually to a small set of users who opt to serve as "beta testers". In the following stage, after beta testing approval, the Remedy may gradually get distributed to the entire relevant community. A Remedy may preferably install itself automatically on the local client. In some instances user input on changes which may affect the user may be required. For that, the Remedy may include "User interaction information" which can later generate a dynamic user interface dialog with which the users can interact in order to make a manual decision.

User satisfaction level is continuously measured and calculated in the background. After applying a remedy, the satisfaction level can be affected, and can be related to the remedy.

In conclusion, the method and system outlined above enable reduction of causes of user frustration from PC usage based on a mechanism that acknowledges user preferences and enables creation and distribution within the system's community of Remedies to situations preventing the fulfillment of the preferred mode of PC operation.

According to some embodiments of the invention, data processing system 100 may further comprise a scoring module (not shown) configured to apply a scoring function to the identified frustration events to yield respective frustration levels being quantitative representation of the frustration events. the scoring function may comprise at least one of: a weighting function associating characteristics of the user and a weighting function associating specified general characteristics of a human behavior. Optionally, the characteristics of the user are learnable during the user's usage of the computer system.

According to some embodiments of the invention, data processing system 100 may further comprise a monitoring module configured to monitor usage patterns of the user to identify frustration reducing operations being user operations sequences associated with a reduction in the frustration level below a specified level.

According to some embodiments of the invention, data processing system 100 may further comprise a sharing module configured to apply a sharing function to the identified frustration reducing operations to yield implementation of the identified frustration reducing operations on other computer systems in communication with the computer system. Optionally, the other computer systems are registered to a service enabling the sharing function thereon.

Figure 2:
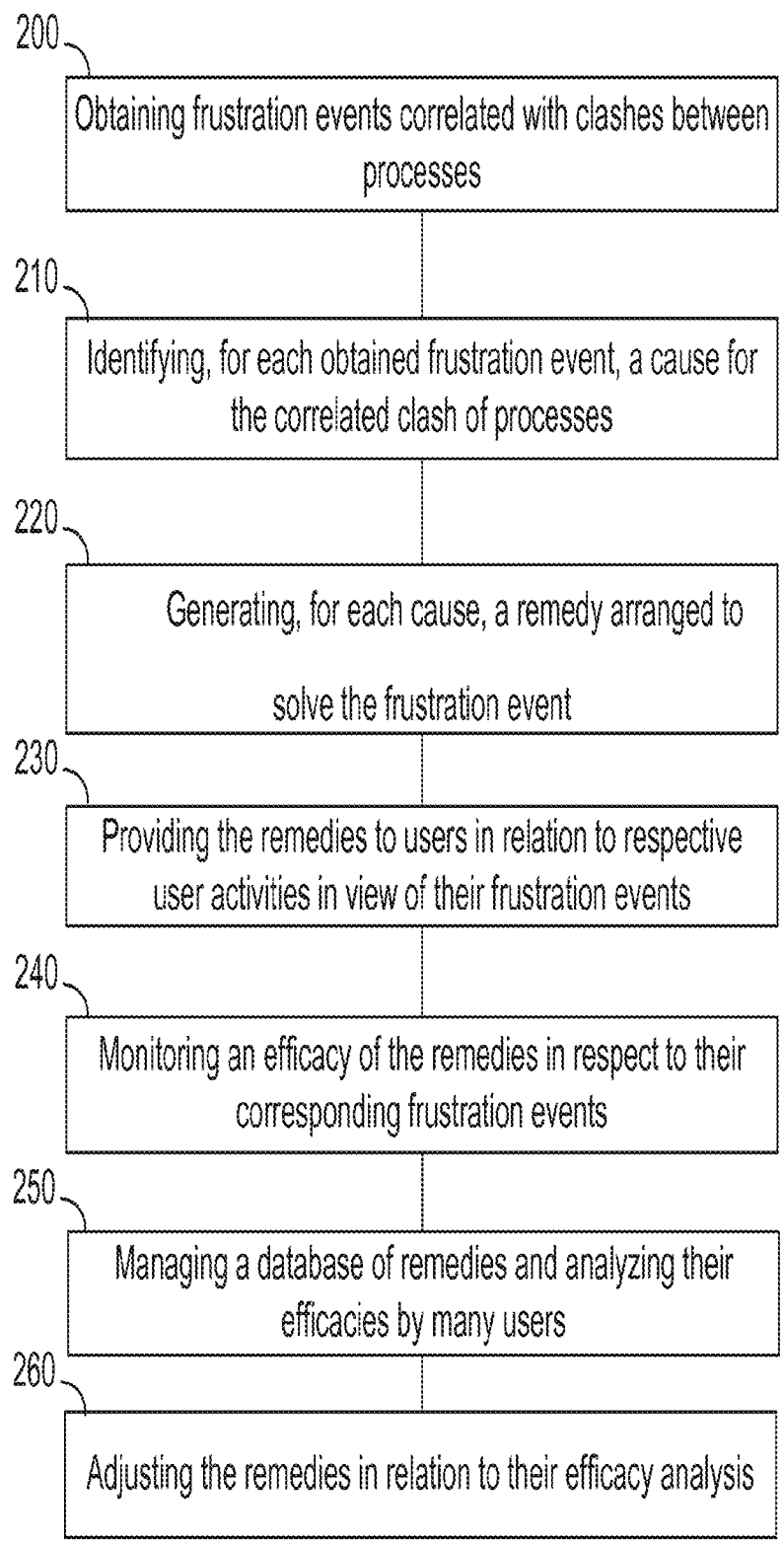
FIG. 2 is a high level flowchart illustrating a computer implemented method according to some embodiments of the invention.

FIG. 2 is a high level flowchart illustrating a computer implemented method according to some embodiments of the invention. The computer implemented method comprises the following stages: obtaining a plurality of frustration events correlated with a plurality of clashes between processes, the processes having a plurality of operation times, relating to a plurality of applications, relating to at least one user activity, and using a plurality of computing resources (stage 200); identifying, for each obtained frustration event, a cause for the correlated clash of processes (stage 210); generating, for each cause, a remedy arranged to solve the frustration event (stage 220); providing the remedies to users in relation to respective user activities in view of their frustration events (stage 230); monitoring an efficacy of the remedies in respect to their corresponding frustration events (stage 240).

The computer implemented method may further comprise managing a database of remedies and analyzing their efficacies by many users (stage 250); and adjusting the remedies in relation to their efficacy analysis (stage 260).

Stages 200-260 are carried out substantially immediately during running the processes, and at least one of the stages 200-260 is performed by at least one computer.

According to some embodiments of the invention, the remedy engine may be operating in a semi automatic configuration. According to this embodiment, the user is provided with a remedy generator that generates, from an intuitive functional language provided by the user, respective code or computer readable instructions that are directed at remedying the conditions in a computer system that were caused by the identified frustration event.

Following are two non limiting examples illustrating the aforementioned use of intuitive functional language. In example 1, a certain application (e.g., itunes) has been slowing down a specific computer. The itunes application is then removed from the start up window in the operating System.

Example 1 is illustrated by the following pseudocode:

```
If ApplicationExist("Itunes") {Who is it relevant for}
If ApplicationUsageLevel("Itunes") = low {What to do - the actual action}
RemoveFromAutomaticStart ("Itunes")
```

As shown above, the first line identifies itunes on the start-up. Then a condition (of usage) is checked in view of a specified threshold. Then, if the condition is met and the itunes application is rarely used, it is removed from the start-up applications.

Example 2, illustrated below in a pseudo code form, shows rescheduling an antivirus application to timeslots where the user is unlikely to use the computer.

```
If ApplicationExist("AVG Anti vir*")     Who is it relevant for
SetAntiVirusSchedule(UserTypicalIdleTime) What to do (actual action)
```

As shown above, the antivirus application is identified by application file name or the like, and then it is set to operate on timeslots in which the user is typically idle so that least disturbance occur.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method comprising:
obtaining a plurality of frustration events correlated with a plurality of clashes between processes, the processes having a plurality of operation times, relating to a plurality of applications, relating to at least one user activity of a user, and using a plurality of computing resources of a computer system of the user;
identifying, for one or more of the obtained frustration events, one or more causes associated with the plurality of clashes between the processes;
generating one or more remedies to solve one or more of the frustration events, wherein generating the one or more remedies comprises generating a script or code that is targeted at eliminating at least a portion of the one or more causes, the script or code being configured to manage, run, stop, configure, remove, or a combination thereof different components of the computer system that are not relevant to a preference of the user, expected performance of the computer system, or both;
providing the one or more remedies to the computer system; and
monitoring an efficacy of the one or more remedies in respect to their corresponding one or more frustration events.

2. The method according to claim 1, further comprising:
applying a scoring function to the frustration events to yield respective frustration levels being quantitative representation of the frustration events.

3. The method according to claim 2, wherein the scoring function comprises at least one of: a weighting function associating characteristics of the user and a weighting function associating specified general characteristics of a human behavior.

4. The method according to claim 3, wherein the characteristics of the user are learnable during the user's usage of the computer system.

5. The method according to claim 2, further comprising:
monitoring usage patterns of the user to identify frustration reducing operations being user operations sequences associated with a reduction in at least one of the frustration levels below a specified level.

6. The method according to claim 5, further comprising:
applying a sharing function to the identified frustration reducing operations to yield implementation of the identified frustration reducing operations on other computer systems in communication with the computer system.

7. The method according to claim 1, wherein the generating is executed in response to user provision of associating at least one identified frustration event with at least one potential remedy.

8. A computer system comprising:
computing hardware resources configured to execute a plurality of processes having a plurality of operation times, relating to a plurality of applications, relating to at least one user activity of a user; and
computing hardware resources configured to:
obtain one or more frustration events correlated with one or more clashes between the processes,
identify, for the one or more frustration events, one or more causes associated with the one or more clashes between the processes,
generate one or more remedies to solve the one or more frustration events, the one or more remedies comprising a script or code that is targeted at eliminating at least a portion of the one or more causes, the script or code being configured to manage, run, stop, configure, remove, or a combination thereof different components of the computer system that are not relevant to a preference of the user, expected performance of the computer system, or both, install the one or more remedies, and monitor an efficacy of the one or more remedies in respect to their corresponding one or more frustration events.

9. The system according to claim 8, further comprising:

a scoring module configured to apply a scoring function to the one or more frustration events to yield respective one or more frustration levels being quantitative representation of the one or more frustration events.

10. The system according to claim 9, wherein the scoring function comprises at least one of: a weighting function associating characteristics of the user and a weighting function associating specified general characteristics of a human behavior.

11. The system according to claim 10, wherein the characteristics of the user are learnable during the user's usage of the computer system.

12. The system according to claim 9, further comprising:

a monitoring module configured to monitor usage patterns of the user to identify frustration reducing operations being user operations sequences associated with a reduction in at least one of the one or more frustration levels below a specified level.

13. The system according to claim 12, further comprising:

a sharing module configured to apply a sharing function to the identified frustration reducing operations to yield implementation of the identified frustration reducing operations on other computer systems in communication with the computer system.

14. The system according to claim 13, wherein generation of the script or code is executed in response to user provision of associating at least one of the one or more frustration events with at least one potential remedy.

15. A computer program product, the computer program product comprising: a non-transitory computer readable storage medium having computer readable program embodied therewith that performs operations comprising:

obtaining a plurality of frustration events correlated with a plurality of clashes between processes, the processes having a plurality of operation times, relating to a plurality of applications, relating to at least one user activity of a user, and using a plurality of computing resources of a computer system of the user;

identifying, for one or more of the obtained frustration events, one or more causes associated with the plurality of clashes between the processes;

generating one or more remedies to solve one or more of the frustration events, wherein generating the one or more remedies comprises generating a script or code that is targeted at eliminating at least a portion of the one or more causes, the script or code being configured to manage, run, stop, configure, remove, or a combination thereof different components of the computer system that are not relevant to a preference of the user, expected performance of the computer system, or both;

providing the one or more remedies to the computer system; and monitoring an efficacy of the one or more remedies in respect to their corresponding one or more frustration events.

16. The computer product according to claim 15, the operations further comprising applying a scoring function to the frustration events to yield respective frustration levels being quantitative representation of the frustration events.

17. The computer product according to claim 16, wherein the scoring function comprises at least one of: a weighting function associating characteristics of the user and a weighting function associating specified general characteristics of a human behavior.

18. The computer product according to claim 17, wherein the characteristics of the user are learnable during the user's usage of the computer system.

19. The computer product according to claim 16, the operations further comprising monitoring usage patterns of the user to identify frustration reducing operations being user operations sequences associated with a reduction in at least one of the frustration levels below a specified level.

20. The computer product according to claim 19, the operations further applying a sharing function to the identified frustration reducing operations to yield implementation of the identified frustration reducing operations on other computer systems in communication with the computer system.

* * * * *